(12) United States Patent
Pomerantz

(10) Patent No.: US 7,552,199 B2
(45) Date of Patent: *Jun. 23, 2009

(54) METHOD FOR AUTOMATIC SKILL-GAP EVALUATION

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/232,769

(22) Filed: Sep. 22, 2005

(65) Prior Publication Data

US 2007/0067441 A1   Mar. 22, 2007

(51) Int. Cl.
G06F 15/16 (2006.01)
G06F 15/173 (2006.01)
G09B 19/00 (2006.01)
G09B 5/00 (2006.01)

(52) U.S. Cl. .................. 709/219; 709/207; 709/230; 709/238; 434/118; 434/307 R

(58) Field of Classification Search .............. 709/223, 709/203, 209, 219, 207, 238, 230; 715/511, 715/756; 705/8; 434/219, 322, 362, 118, 434/307 R
See application file for complete search history.

(56) References Cited

U.S. PATENT DOCUMENTS

| 4,571,682 | A | * | 2/1986 | Silverman et al. | 600/301 |
| 5,823,781 | A | * | 10/1998 | Hitchcock et al. | 434/118 |
| 6,606,480 | B1 | * | 8/2003 | L'Allier et al. | 434/362 |
| 2002/0086275 | A1 | * | 7/2002 | Boney et al. | 434/350 |

* cited by examiner

Primary Examiner—Joseph E Avellino
Assistant Examiner—Harunur Rashid
(74) Attorney, Agent, or Firm—Yee & Associates, P.C.; Jeffrey S. LaBaw

(57) ABSTRACT

A method for automatic user skill-gap evaluation using a proxy server or a proxy application. The proxy server or application receives a user input from a user and analyzes the user input to determine whether the user input falls below an acceptable user skill threshold level. The user input consists of user activity within an application and the user activity is recorded in a user action log. To determine whether the user input falls below the acceptable user skill threshold level, the proxy server or application compares the user activity recorded in the user action log with user skill-gap behavior patterns created by a subject matter expert. In response to determining that the user activity recorded in the user action log falls below the acceptable user skill threshold level, the proxy server or application sends a specific training module to the user based on an identified user skill-gap.

1 Claim, 3 Drawing Sheets

400

402 USER NAME : JOHN DOE          432 SESSION ID: 998877Q
404 USER PASSWORD: **********
406 CUSTOMER NUMBER: 123XYZ
408 LOGIN TIME: 1:00 p.m.
410 LOGOUT TIME: 1:30 p.m.
412 APPLICATION ACCESSED: e-BANKING
    414 ACTION TAKEN: OPEN FUND TRANSFER FORM
                     DATA ENTRY TIME- 5 MINUTES 416
    418 ACTION TAKEN: CANCEL FUND TRANSFER FORM
    420 ACTION TAKEN: OPEN FUND TRANSFER FORM
                     DATA ENTRY TIME- 3 MINUTES 422
    424 ACTION TAKEN: CANCEL FUND TRANSFER FORM
    426 ACTION TAKEN: OPEN FUND TRANSFER FORM
                     DATA ENTRY TIME- 20 MINUTES 428
    430 ACTION TAKEN: SUBMIT FUND TRANSFER FORM

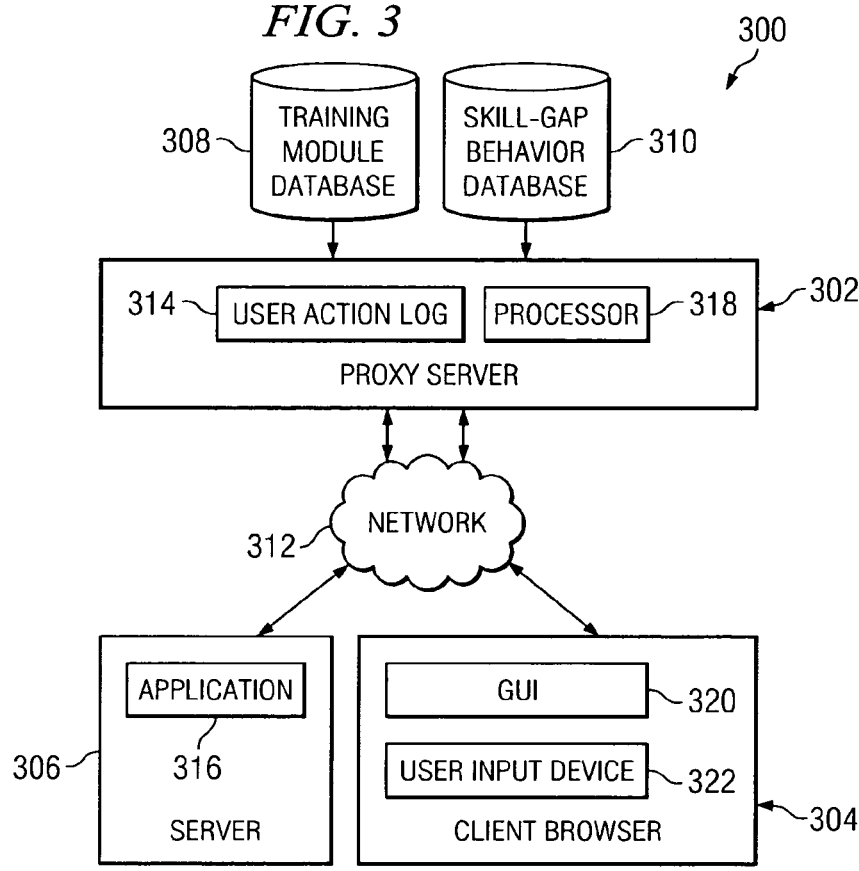
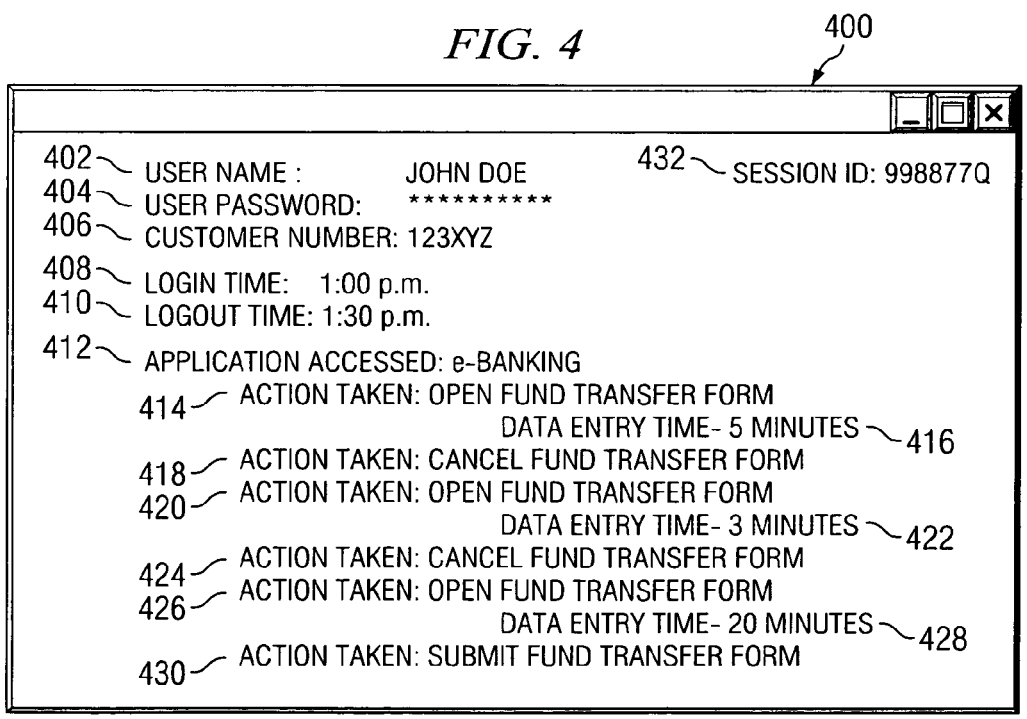

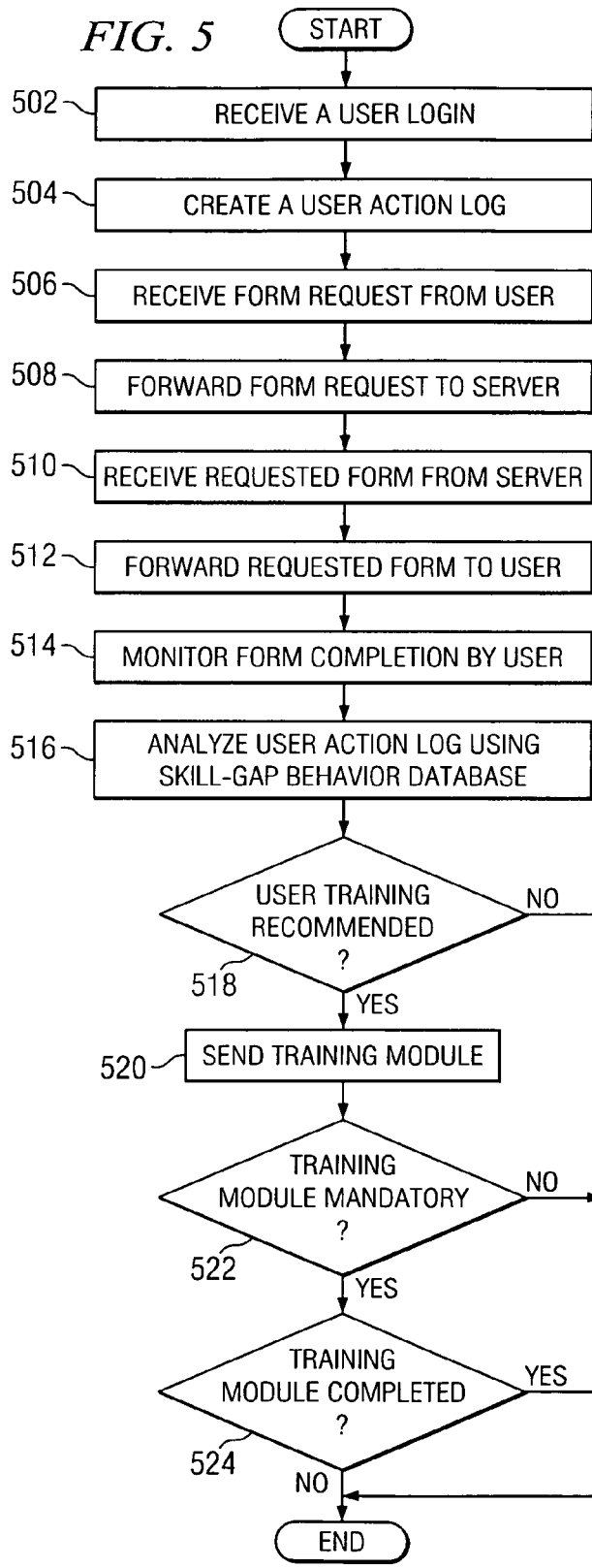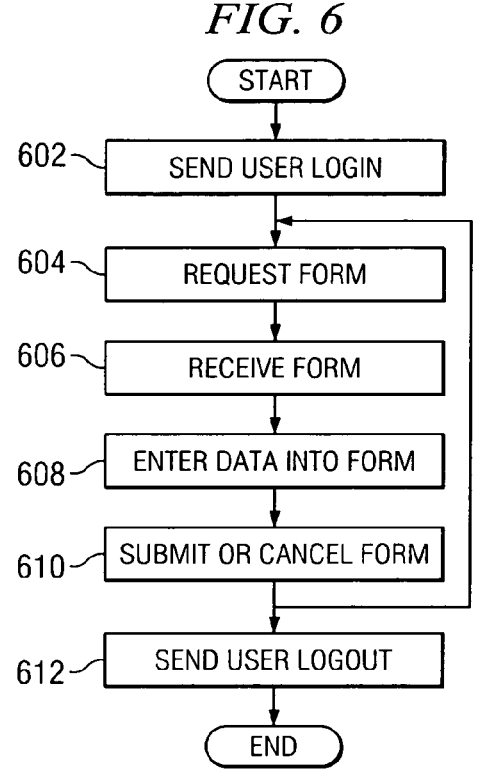

METHOD FOR AUTOMATIC SKILL-GAP EVALUATION

BACKGROUND OF THE INVENTION

1. Field of the Invention

The present invention relates to an improved data processing system. More specifically, the present invention is directed to a method, apparatus, and computer usable code for automatic skill-gap evaluation.

2. Description of the Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized communications and commerce, as well as, being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to the IP address by a domain name system (DNS), which is a service that translates the symbolic name entered by the user into an IP address by looking up the domain name in a database.

The browser includes a user interface, which is a GUI that allows the user to interface or communicate with another browser. This interface provides for selection of various functions through menus and allows for navigation. For example, a menu may allow a user to perform various functions, such as saving a file, opening a new window, displaying a history, and entering a URL.

Presently, no system automatically monitors whether a browser user, such as an employee, customer, student, et cetera, is able to properly enter data or information into a Web application form. Current methods for identifying a user's lack of browser skills are to give the user an examination or to obtain user input by speaking with the user. Both of these current methods require additional time, resources, and personnel to be used in the process. In addition, no current system automatically offers the user specific remediation once a user's skills are found to be lacking in a particular area.

SUMMARY OF THE INVENTION

Embodiments of the present invention provide a method for automatic user skill-gap evaluation using a proxy. The proxy may be implemented as a proxy server or as a proxy application. The proxy server may reside in a distributed data processing system and the proxy application may reside in a stand alone computer. The proxy server or application receives a user input from a user and analyzes the user input to determine whether the user input falls below an acceptable user skill threshold level. The user input consists of user activity within an application and the user activity is recorded in a user action log. To determine whether the user input falls below the acceptable user skill threshold level, the proxy server or application compares the user activity recorded in the user action log with user skill-gap behavior patterns. In response to determining that the user activity recorded in the user action log falls below the acceptable user skill threshold level, the proxy server or application sends a specific training module to the user based on the identified user skill-gap. In addition, the proxy server or application dynamically updates the user skill-gap behavior patterns after analyzing a plurality of user action logs. The training module may be one of a plurality of training modules stored in a training module database and may be either a voluntary training module or a mandatory training module. A subject matter expert creates both the user skill-gap behavior patterns and the training modules.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a proxy server that automatically monitors activity between a client browser and a server;

FIG. 4 is an exemplary illustration of a user action log in accordance with an embodiment of the present invention;

FIG. 5 is a flowchart illustrating an exemplary process for monitoring user actions in a distributed data processing system using a proxy server in accordance with an embodiment of the present invention; and FIG. 6 is a flowchart illustrating an exemplary process for a client browser in accordance with an embodiment of the present invention.

DETAILED DESCRIPTION OF THE PREFERRED EMBODIMENT

Figure 1:
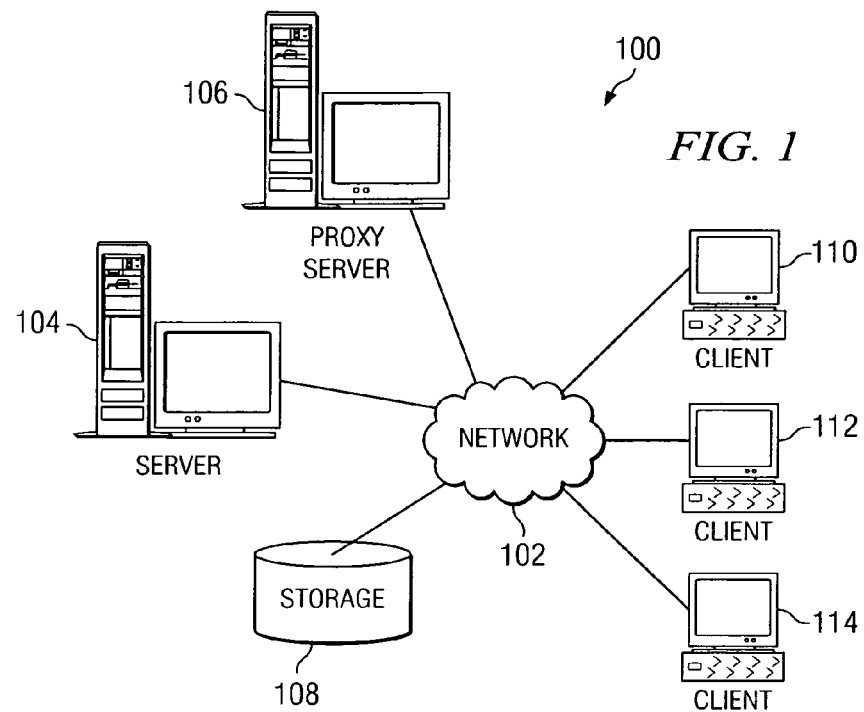
FIG. 1 is a pictorial representation of a network of data processing systems in which aspects of the present invention may be implemented.
Figure 2:
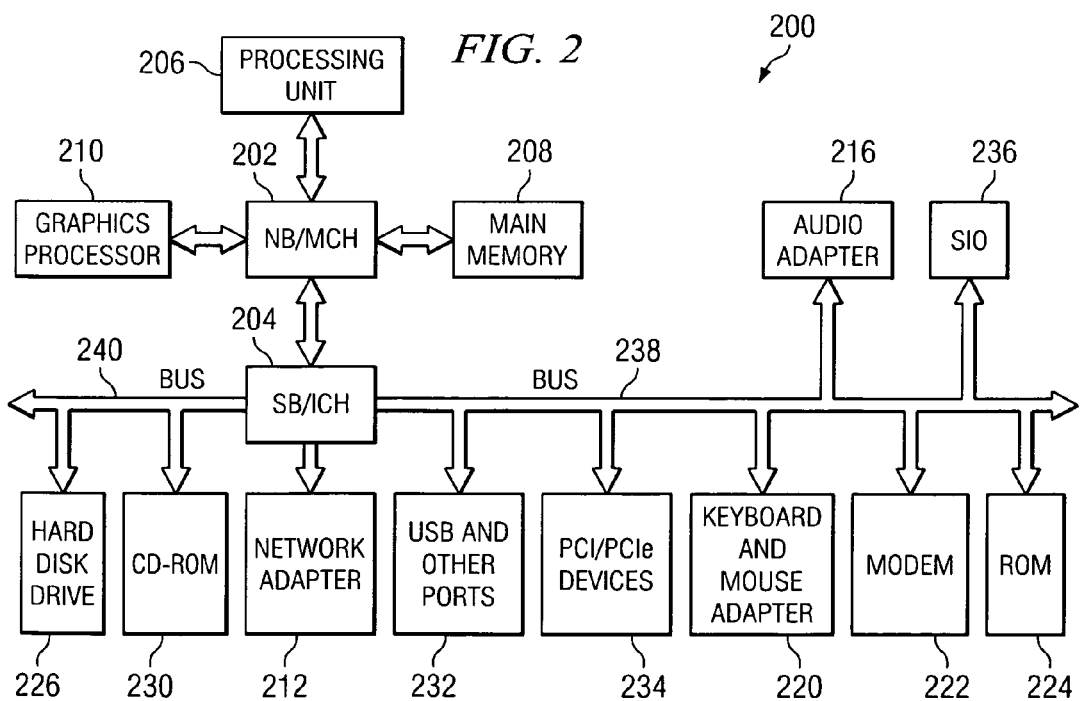
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and proxy server 106 connect to network 102 along with storage unit 108. In addition, clients 110, 112, and 114 connect to network 102. These clients 110, 112, and 114 may be, for example, personal computers or network computers.

In the depicted example, server 104 provides data, such as boot files, operating system images, Web forms and applications to clients 110, 112, and 114. Clients 110, 112, and 114 are clients to server 104 in this example. In addition, in the depicted example, proxy server 106 functions as a gateway between server 104 and clients 110, 112, and 114. In other words, all requests and user actions from clients 110, 112, and 114 to server 104 go through proxy server 106 first for monitoring and analysis. Likewise, all responses from server 104 to clients 110, 112, and 114 requests are routed through proxy server 106. Network data processing system 100 may include additional servers, proxy servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104, proxy server 106 or client 110 in FIG. 1, in which computer usable program code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or the LINUX operating system (eServer, pSeries, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, apparatus, and computer usable program code for automatic user skill-gap evaluation using a proxy. The proxy may be implemented as a proxy server or as a proxy application. However, for this illustrative example a proxy server implementation is described. A user skill-gap is the inability of the user to perform a task competently or in a timely manner as compared to others at the same knowledge or experience level.

The proxy server monitors a client browser user in order to identify user skill-gaps. The proxy server receives a user login from a client browser, which is one of a plurality of client browsers. In response to receiving the user login, the proxy server creates a user action log. The user action log records user activity within a server application form. The proxy server analyzes the user action log by comparing the user activity recorded in the user action log with user skill-gap behavior patterns stored in a skill-gap behavior database. In addition, the proxy server dynamically updates the user skill-gap behavior patterns after analyzing a plurality of user activities recorded in a plurality of user action logs.

After the proxy server determines that the user activity recorded in the user action log falls below an acceptable skill-gap threshold level, the proxy server sends a specific training module to the client browser user based on the identified user skill-gap. The training module sent by the proxy server to the client browser user may be one of a plurality of training modules stored in a training module database and may be either a voluntary training module or a mandatory training module. A subject matter expert creates the user skill-gap behavior patterns and the training modules.

Using aspects of the present invention, a client browser user may not be required to complete a general training program on a server application, but is only required to complete a specific training module based upon an automatic identification of a user skill-gap. In addition, valuable user time may not be required to manually take a skill-gap evaluation examination or to speak with a system administrator in order to determine user skill-gaps.

Referring now to FIG. 3, a block diagram illustrating a proxy server that automatically monitors activity between a client browser and a server is shown. Distributed data processing system 300, contains proxy server 302, client browser 304, server 306, training module database 308, and skill-gap behavior database 310. For example, network data processing system 100 contains proxy server 106, client 110, server 104, and storage 108 in FIG. 1. However, distributed data processing system 300 is not restricted to the above listed architecture. Any architecture that may utilize embodiments of the present invention may be used. For example, proxy server 302 may not require skill-gap database 310 and training module database 308. Proxy server 302 may store skill-gap behavior and training modules in a main memory, such as main memory 208 in FIG. 2. Distributed data processing system 300 is connected via network 312, such as network 102 in FIG. 1.

Proxy server 302 may be implemented as a gateway between client browser 304 and server 306. As a gateway, proxy server 302 receives all communication between client browser 304 and server 306 over network 312. By receiving all communication between client browser 304 and server 306, proxy server 302 has the ability to monitor all user activity between client browser 304 and server 306.

Proxy server 302 may monitor user activity of client browser 304 in order to automatically identify user skill-gaps. The automatic identification of user skill-gaps during a session affords proxy server 302 an opportunity to offer the user remediation by providing an appropriate training module to assist the user in task performance and improve the user's skills. Proxy server 302 may define a session as the time between a user login and a user logout of distributed data processing system 300. A user login may be defined as the proxy server receiving a user name, password, and any other pertinent identification information to particularly identify the user during the session. A user logout may be defined as the proxy server receiving a user input to terminate the session. Alternatively, a session may be defined as the time between when a user opens and closes an application, such as application 316.

In order to identify user skill-gaps, proxy server 302 utilizes user action log 314 and skill-gap behavior database 310. User action log 314 collects data relating to the user and the user's activities during a session. User action log 314 may record and store information, such as, for example, user identification, user password, user login and logout times, application(s) accessed, data entries, amount of time to make data entries, et cetera.

Skill-gap behavior database 310 contains user skill-gap behavior patterns. A system administrator utilizes a subject matter expert (SME) to identify and create the user skill-gap behavior patterns. A subject matter expert is an individual who exhibits the highest level of expertise in performing a specialized job, task, or skill within a particular field of endeavor. Having this high level of expertise, the subject matter expert is able to construct user behavior patterns that indicate a skill-gap in the user's performance. During a session, processor 318 in proxy server 302, such as processor 206 in data processing system 200 in FIG. 2, compares a user's actions or performance recorded in user action log 314 with the user skill-gap behavior patterns stored in skill-gap behavior database 310.

In addition, processor 318 may add entries to skill-gap behavior database 310 based upon user patterns recorded in user action log 314. In other words, proxy server 302 may learn user behavior patterns over time from monitoring a plurality of users. For example, processor 318 may determine after analyzing thousands of logs contained within user action log 314 that only 5 seconds is required to enter data X in Form Z instead of 10 seconds as originally estimated by the subject matter expert. Accordingly, processor 318 may add the 5 second entry time for data X in Form Z to skill-gap behavior database 310. As a result, processor 318 may dynamically update skill-gap behavior database 310 in order that proxy server 302 may be more efficient in monitoring client browser 304 user actions.

If processor 318 discovers a skill-gap in the user's session performance, then processor 318 accesses training module database 308. Training module database 308 contains a plurality of training modules that were also developed by the same subject matter expert that created the user skill-gap behavior patterns. The plurality of training modules stored in training module database 308 are specific teaching tools designed to assist the user in the specific area where the user skill-gap was found.

The plurality of training modules contained within training module database 308 may either be voluntary or mandatory. In other words, a user may elect not to take or complete the training module if the module is voluntary. However, if the training module is mandatory, then the user must complete the training module in order to continue the session in which the proxy server identified the user skill-gap.

For example, in the situation of a customer using distributed data processing system 300, the enterprise utilizing data processing system 300 may make the training module voluntary so as not to further frustrate or irritate the customer during the session. Thus, in the case of a customer, the enterprise may view the training module only as a voluntary aid to assist the customer. But, in the case of an employee that is entering critical enterprise information into distributed data processing system 300, the enterprise may make completion of the training module mandatory in order for the employee to continue working in application 316. Thus, in the case of the employee, the enterprise may view the training module as a mandatory necessity to reduce employee errors and increase employee productivity.

The user may retrieve application 316 by using client browser 304 to send a request over network 312 for application 316 contained in server 306. Client browser 304 contains graphical user interface (GUI) 320 and user input device 322. Graphical user interface 320 allows the user to interact with application 316. User input device 322, such as a keyboard or a mouse, may be used, for example, to input data into application 316.

The request for application 316 is first sent to proxy server 302. Proxy server 302 receives the request for application 316 and creates a log of the user's activities in user action log 314. Proxy server 302 creates the user action log to monitor the user's activities during the session. The request for application 316 is then forwarded to server 306. In response to the request for application 316, server 304 sends application 316 to proxy server 302. Finally, proxy server 302 sends application 316 to client browser 304.

As the user interacts with application 316, proxy server 302 monitors all user activity associated with application 316. Proxy server 302 records the monitored activity in user action log 314. As mentioned above, processor 318 analyzes the user actions recorded in user action log 314 by comparing the recorded user actions with the user skill-gap behavior patterns stored in skill-gap behavior database 310. If processor 318 finds a user skill-gap, then processor 318 offers the user of client browser 304 a specific training module to complete for remediation of the skill-gap.

In another embodiment of the present invention, a proxy application may be placed between the user interface and the application the user wishes to use. The proxy application is similar in function to proxy server 302 as described above in that the proxy application acts as a gateway between the user interface and the desired application. Like proxy server 302, the proxy application records and analyzes all user activity in the desired application and recommends training when a user skill-gap is found to exist. Unlike the described implementation of proxy server 302 in distributed data processing system 300 above, the proxy application, desired application, and user interface are all contained within a single computer.

Turning now to FIG. 4, an exemplary illustration of a user action log is depicted in accordance with an embodiment of the present invention. A proxy server creates user action log 400. For example, proxy server 302 creates user action log 314 in FIG. 3.

User action log 400 is a log or record of all of the user's activities during a session. In this illustrative example, user action log 400 contains user name 402, user password 404, and customer number 406 in order to particularly identify customer John Doe. Consequently, customer John Doe, with customer number 123XYZ, is the client browser user in this depicted example. Also, the proxy server generates session identification number 432 in order to identify user action log 400 for reference. In addition, the proxy server records login time 408, logout time 410, application accessed 412, action taken 414, 418, 420, 424, 426, and 430 and data entry time 416, 422, and 428.

Login time 408 is 1:00 p.m. for John Doe, with application accessed 412 being e-Banking. Action taken 414 by John Doe in the e-Banking application is open fund transfer form. Data entry time 416 for action taken 414 is 5 minutes. Action taken 418 is cancel fund transfer form. Action taken 420 is open fund transfer form. Data entry time 422 for action taken 420 is 3 minutes. Action taken 424 is cancel fund transfer form. Action taken 426 is open fund transfer form. Data entry time 428 for action taken 426 is 20 minutes. Action taken 430 is submit fund transfer form. Logout time 410 is 1:30 p.m. for John Doe.

The proxy server analyzes the information contained within user action log 400 by comparing the information contained within user action log 400 with user skill-gap behavior patterns stored in a database, such as, for example, user skill-gap behavior patterns stored in skill-gap behavior database 310 in FIG. 3. In this illustrated example, the proxy server may identify John Doe as having a skill-gap because of action taken 418 and 424 of cancel fund transfer form. Successive cancellations of a data entry form in an application may be one example of a user skill-gap behavior pattern identified by the subject matter expert.

Further, data entry time 428 of 20 minutes may also indicate a skill-gap in John Doe's performance because the subject matter expert may have estimated that data entry for the fund transfer form is 10 minutes. Consequently, the proxy server may send an appropriate training module from a training module database, such as, for example, training module database 308 in FIG. 3, to John Doe's browser. One possible proxy server recommended training module for this particular illustration may be, for example, a keyboard training module to assist John Doe in data entry. Another possible proxy server recommended training module may be, for example, an instruction training module to explain how to properly fill-out an e-Banking fund transfer form. Also, the proxy server recommended training modules for customer John Doe in the above example may be voluntary training modules as opposed to mandatory training modules.

Of course, those skilled in the art will appreciate that user action log 400 may contain more information or less information regarding the user's session activities than is shown in this illustrated example. Any information deemed necessary by an enterprise utilizing an embodiment of the present invention may be placed in user action log 400. Further, any type of training module may be utilized by embodiments of the present invention and any type of skill-gap behavior pattern may be developed and used by embodiments of the present invention.

With reference now to FIG. 5, a flowchart is shown illustrating an exemplary process for monitoring user actions in a distributed data processing system using a proxy server in accordance with an embodiment of the present invention. The process depicted in FIG. 5 may be implemented in a proxy server, such as, for example, proxy server 302 in FIG. 3.

The process begins when a proxy server receives a user login (step 502), such as, for example, user name 402, user password 404, and customer number 406 in FIG. 4, from a user using a client browser, such as client browser 304 in FIG. 3, over a network, such as network 312 in FIG. 3. Subsequent to receiving the user login in step 502, the proxy server creates a user action log (step 504), such as user action log 400 in FIG. 4. In addition to receiving the user login in step 502, the proxy server receives a user request for a Web form (step 506).

The user requests the Web form from an application that resides in a server, such as application 316 that resides in server 306 in FIG. 3. Consequently, after receiving the user form request in step 506, the proxy server forwards the user form request to the server (step 508). The server, in response to receiving the user form request in step 508, sends the user requested form to the proxy server (step 510). In response to receiving the user requested form from the server in step 510, the proxy server forwards the user requested form to the user's browser (step 512).

Upon receiving the user requested form from the proxy server in step 512, the user may input data into the user requested form using a user input device, such as user input device 322 in FIG. 3. The proxy server monitors and records all user actions or activity during the session, such as data entry into the user requested form (step 514). The proxy server records all the user's activities in the user action log created by the proxy server in step 504. For example, the proxy server records login time 408, logout time 410, application accessed 412, user action taken 414, 418, 420, 424, 426, and 430, and data entry time 416, 422, and 428 in user action log 400 in FIG. 4.

While the proxy server monitors and records the user's activities in the user action log in step 514, the proxy server analyzes the information contained in the user action log by comparing the information contained in the user action log with user skill-gap behavior patterns stored in a database, such as skill-gap behavior database 310 in FIG. 3 (step 516). The skill-gap behavior patterns stored in the database include a threshold or a level of acceptability for the user's performance or activity during the session. If the user's session performance or activity falls below the threshold or level of acceptability, then the proxy server identifies the user as having a skill-gap.

Subsequent to the proxy server analyzing the information contained in the user action log in step 516, the proxy server determines whether user training is recommended (step 518). If the proxy server does not recommend user training, no output of 518, then the process proceeds to step 526 below. If the proxy server recommends user training, yes output of step 518, then the proxy server sends a specific training module from a database, such as training module database 308 in FIG. 3, to the user for remediation (step 520). The proxy server sends the specific training module to the user based upon the proxy server's analysis of the user action log in step 516.

Next, the proxy server determines if the training module, which was sent to the user in step 520, is mandatory (step 522). If the proxy server determines that the training module is not mandatory (i.e., voluntary), no output of step 522, then the process proceeds to step 526 below. If the proxy server determines that the training module is mandatory, yes output of step 522, then the proxy server determines if the user completed the mandatory training module (step 524). If the user does not complete the mandatory training module, no output of step 524, the process terminates thereafter. If the user completes the mandatory training module, yes output of step 524, then the proxy server allows the user continued access to the server application (step 526).

After completing the server application form, the user submits or sends the server application form back to the server over the network. The proxy server receives the completed server application form (step 528) and then the proxy server forwards the completed server application form to the server (step 530). When the user finishes the session, the user sends a user logout to the server. The proxy server receives the user logout (step 532) and the process terminates thereafter.

Referring now to FIG. 6, a flowchart is shown illustrating an exemplary process for a client browser in accordance with an embodiment of the present invention. The process depicted in FIG. 6 may be implemented in a client browser, such as, for example, client browser 304 in FIG. 3.

The process begins when a client browser, which is used by a user, sends a user login (step 602), such as, for example, user name 402, user password 404, and customer number 406 in FIG. 4, to a server, such as server 306 in FIG. 3, over a network, such as network 312 in FIG. 3. Subsequent to sending the user login in step 602, the client browser requests a server application form, such as application 316 in FIG. 3 (step 604). The client browser receives the requested server application form from the server (step 606). The user enters data into the server application form using a user input device, such as user input device 322 in FIG. 3, associated with the client browser (step 608).

After the user completes the data entry in the server application form in step 608, the user submits the form back to the server over the network using the client browser (step 610). Alternatively, the user may cancel the server application form rather than submit the server application form to the server. Subsequent to the user submitting or canceling the server application form in step 610, the process may either return to step 604 in order for the user to request another server application form from the server or proceed to step 612 if the user does not desire to request another server application form. When the user finishes the session, the user sends a user logout to the server (step 612) and the process terminates thereafter.

Thus, embodiments of the present invention provide a computer implemented method, apparatus, and computer usable program code for automatic user skill-gap evaluation using a proxy server. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatic user skill-gap evaluation using a proxy server, the computer implemented method comprising:

routing all communication over a network between a client browser and a server through a proxy server so that the proxy server can monitor user activity within a Web application form to automatically identify a user skill-gap while a user interacts with the Web application form during a network session without requiring the user to take a skill-gap evaluation examination, wherein the Web application form resides on the server connected to the network, and wherein the client browser is one of a plurality of client browsers connected to the network;

receiving by the proxy server the user activity within the Web application form during the network session, wherein the user activity within the Web application form is recorded in a user action log by the proxy server, and wherein the user action log records user identification, user password, network session identification number to identify the user action log, user login time, user logout time, applications accessed during the network session, data entries in the applications, and the amount of time to make the data entries in the applications;

analyzing by the proxy server the user activity within the Web application form during the network session to determine whether the user input falls below an acceptable user skill threshold level to automatically identify the user skill-gap, wherein analyzing the user activity to determine whether the user activity falls below the acceptable user skill threshold level includes comparing the user activity recorded in the user action log with user skill-gap behavior patterns that are stored in a skill-gap behavior database for identifying user skill-gaps, and wherein a user skill-gap is an inability by the user to perform one or more tasks in the Web application form competently and in a timely manner as compared to other users at a same experience level, and wherein the user skill-gap behavior patterns are created by a subject matter expert, and wherein the user skill-gap behavior patterns are dynamically updated by the proxy server after the proxy server analyzes a plurality of user action logs for a plurality of users;

responsive to determining that the user activity falls below the acceptable user skill threshold level, sending by the proxy server a specific training module to the client browser based on an identified user skill-gap to provide remediation to the user for the identified user skill-gap, wherein the specific training module is one of a plurality of specific training modules that are stored in a training module database;

determining by the proxy server whether the specific training module is a mandatory training module or a voluntary training module, wherein the user must complete the mandatory training module prior to continuing the user activity within the Web application form in which the proxy server identified the user skill-gap, and wherein the user has an option not to take the voluntary training module prior to continuing the user activity within the Web application form in which the proxy server identified the user skill-gap;

responsive to determining that the specific training module is a mandatory training module, determining by the proxy server whether the mandatory training module was completed by the user;

responsive to determining that the mandatory training module was completed by the user, allowing continued access to the Web application form by the proxy server;

responsive to determining that the mandatory training module was not completed by the user, denying continued access to the Web application form by the proxy server; and responsive to determining that the specific training module is a voluntary training module, allowing continued access to the Web application form by the proxy server regardless of whether the user takes the voluntary training module or not.

* * * * *